US012040527B2

(12) United States Patent
Tryson

(10) Patent No.: US 12,040,527 B2
(45) Date of Patent: Jul. 16, 2024

(54) REDUNDANT NETWORK SYSTEM

(71) Applicant: TE Connectivity Services GmbH, Schaffhausen (CH)

(72) Inventor: Michael Joseph Tryson, Spring Grove, PA (US)

(73) Assignee: TE CONNECTIVITY SOLUTIONS GmbH, Schaffhausen (CH)

(*) Notice: Subject to any disclaimer, the term of this patent is extended or adjusted under 35 U.S.C. 154(b) by 312 days.

(21) Appl. No.: 17/307,742

(22) Filed: May 4, 2021

(65) Prior Publication Data

US 2022/0359969 A1 Nov. 10, 2022

(51) Int. Cl.
*H01P 5/12* (2006.01)
*H01B 11/00* (2006.01)
*H01R 25/00* (2006.01)

(52) U.S. Cl.
CPC .............. *H01P 5/12* (2013.01); *H01B 11/002* (2013.01); *H01R 25/003* (2013.01)

(58) Field of Classification Search
CPC ......... H01R 25/003; H01R 31/02; H01P 5/12; H01B 11/002
See application file for complete search history.

(56) References Cited

U.S. PATENT DOCUMENTS 7,532,817 B1 * 5/2009 Ko ...................... H04J 14/0294 398/20
7,724,778 B2 * 5/2010 Ying ......................... G06F 1/26 700/286
9,380,003 B2 7/2016 Tang et al.
10,574,002 B1 * 2/2020 Henry .................. H01R 13/405
10,877,233 B1 12/2020 Dai et al.
10,944,584 B1 3/2021 Cheng et al.
11,012,252 B2 5/2021 Lam et al.
11,018,709 B2 5/2021 Lam et al.
11,032,111 B2 6/2021 Sun et al.
11,137,550 B2 10/2021 Chen et al.
11,218,186 B2 1/2022 Lin et al.
11,552,873 B2 1/2023 Dai et al.
(Continued)

FOREIGN PATENT DOCUMENTS

CN 210327570 U 4/2020
GB 2450848 B 10/2010

*Primary Examiner* — William H. Mayo, III
*Assistant Examiner* — Rhadames Alonzo Miller

(57) ABSTRACT

A redundant network system includes a compute node having a network interface card includes a node port. The redundant network system includes a primary switch having a primary switch component and a primary switch port coupled to the primary switch component. The redundant network system includes a secondary switch having a secondary switch component and a secondary switch port coupled to the secondary switch component. The redundant network system includes a cable assembly having a node connector coupled to the node port, a primary connector coupled to the primary switch port, and a secondary connector coupled to the secondary switch port. The cable assembly includes a signal splitting circuit between the node connector and the primary and secondary connectors. The cable assembly includes a first cable between the signal splitting circuit and the primary connector and a second cable between the signal splitting circuit and the secondary connector.

20 Claims, 2 Drawing Sheets

(56) References Cited

U.S. PATENT DOCUMENTS

| | | | | |
|---|---|---|---|---|
| 11,581,913 | B2 | 5/2023 | Lam et al. | |
| 11,646,959 | B2 | 5/2023 | Qian et al. | |
| 2006/0077888 | A1* | 4/2006 | Karam | H04L 12/10<br>370/216 |
| 2011/0279939 | A1* | 11/2011 | Kitchener | G06F 1/30<br>361/87 |
| 2013/0163984 | A1* | 6/2013 | Kelly | H04B 10/032<br>385/24 |
| 2014/0105592 | A1* | 4/2014 | Kataria | H04B 10/032<br>398/2 |
| 2014/0258772 | A1* | 9/2014 | Kataria | H04B 3/46<br>714/4.11 |
| 2014/0341568 | A1* | 11/2014 | Zhang | H04Q 11/0005<br>398/34 |
| 2018/0278341 | A1* | 9/2018 | Desbruslais | H04B 10/032 |
| 2020/0136286 | A1* | 4/2020 | McClelland, II | H01R 24/60 |

* cited by examiner

REDUNDANT NETWORK SYSTEM

BACKGROUND OF THE INVENTION

The subject matter herein relates generally to redundant network systems.

Network systems, such as data centers, use networking components to process data. For example, servers are connected to switches by cable assemblies. In some applications, it is desirable to provide redundancy of the data connections between the servers and the switches. Such network systems typically have parallel architectures to achieve redundancy. For example, the server includes first and second ports with a first cable assembly coupling the first port to a first switch and a second cable assembly coupling the second port to a second switch. Such redundant systems are expensive due to the duplication of the components. Other known systems use an electronic switching device at the server to control signal switching along a Y-cable between the first and second switches. However, the electronic switching device is expensive and increase switching time between the signal paths.

A need remains for a robust redundant network system.

BRIEF DESCRIPTION OF THE INVENTION

In one embodiment, a redundant network system is provided. The redundant network system includes a compute node having a network interface card includes a node port. The redundant network system includes a primary switch having a primary switch component and a primary switch port coupled to the primary switch component. The redundant network system includes a secondary switch having a secondary switch component and a secondary switch port coupled to the secondary switch component. The redundant network system includes a cable assembly having a node connector coupled to the node port, a primary connector coupled to the primary switch port, and a secondary connector coupled to the secondary switch port. The cable assembly includes a signal splitting circuit between the node connector and the primary and secondary connectors. The cable assembly includes a first cable between the signal splitting circuit and the primary connector and a second cable between the signal splitting circuit and the secondary connector.

In another embodiment, a redundant network system is provided. The redundant network system includes a compute node having a network interface card includes a node port. The redundant network system includes a primary switch having a primary switch component and a primary switch port coupled to the primary switch component. The redundant network system includes a secondary switch having a secondary switch component and a secondary switch port coupled to the secondary switch component. The redundant network system includes a cable assembly having a node connector coupled to the node port, a primary connector coupled to the primary switch port, and a secondary connector coupled to the secondary switch port. The cable assembly includes a signal splitting circuit between the node connector and the primary and secondary connectors. The signal splitting circuit includes a splitter has a single input, a first output, and a second output. The signal splitting circuit includes a first retimer coupled to the first output and a second retimer coupled to the second output. The cable assembly includes a first cable coupled between the first retimer and the primary connector and a second cable coupled between the second retimer and the secondary connector.

In a further embodiment, a cable assembly for a redundant network system is provided and has a compute node has a node port, a primary switch has a primary switch port, and a secondary switch has a secondary switch port. The cable assembly includes a node connector configured to be coupled to the node port. The cable assembly includes a primary connector configured to be coupled to the primary switch port. The cable assembly includes a secondary connector configured to be coupled to the secondary switch port. The cable assembly includes a signal splitting circuit between the node connector and the primary and secondary connectors. The signal splitting circuit includes a splitter has a single input, a first output and a second output. The signal splitting circuit includes a first signal conditioner coupled to the first output and a second signal conditioner coupled to the second output. The cable assembly includes a first cable coupled between the first signal conditioner of the signal splitting circuit and the primary connector. The cable assembly includes a second cable coupled between the second signal conditioner of the signal splitting circuit and the secondary connector. The first and second cables form redundant signal paths between the single node port of the compute node and the primary and secondary switch ports of the primary and secondary switches.

DETAILED DESCRIPTION OF THE INVENTION

Figure 1:
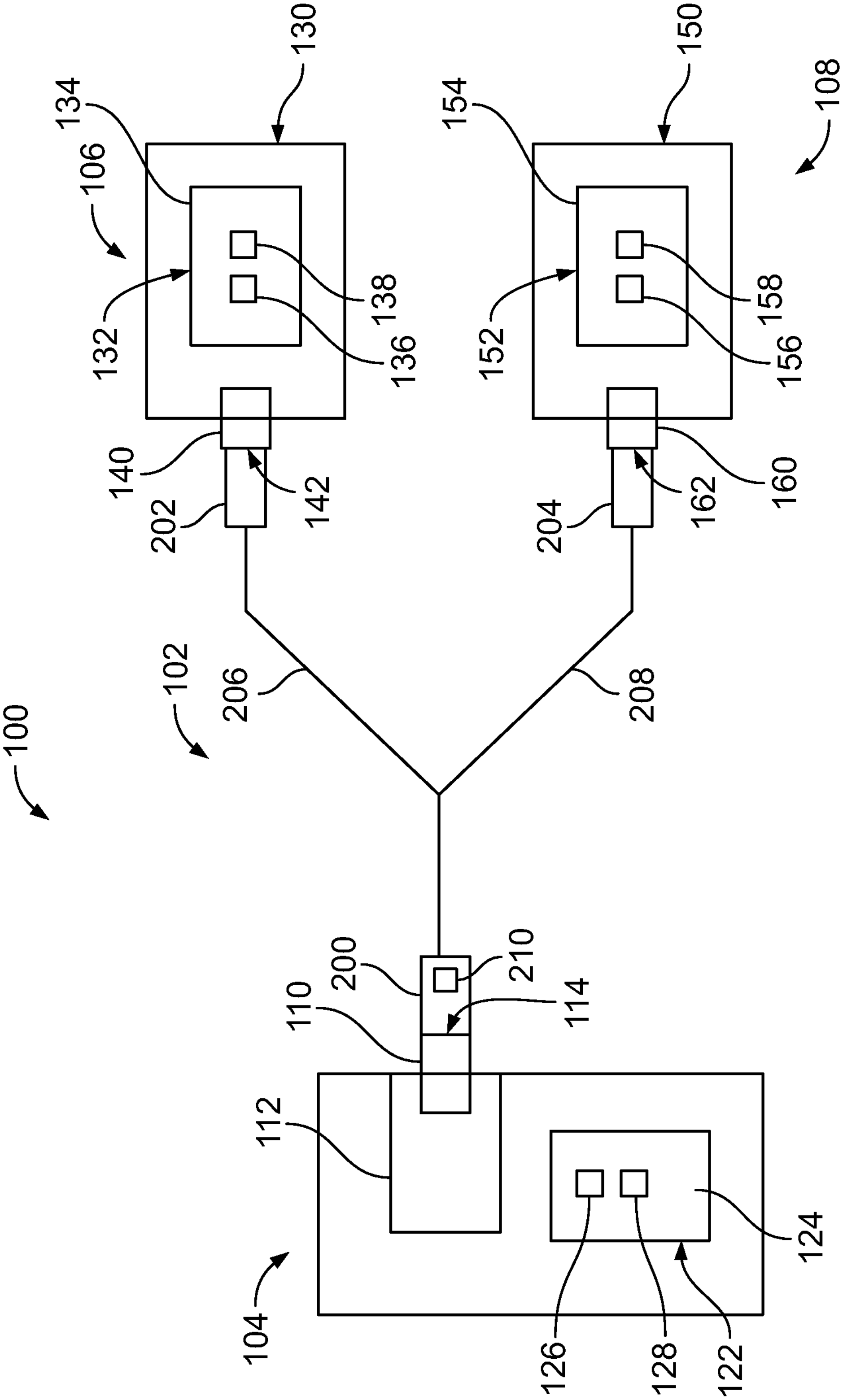
FIG. 1 is a schematic illustration of a redundant network system in accordance with an exemplary embodiment.

FIG. 1 is a schematic illustration of a redundant network system 100 in accordance with an exemplary embodiment. The redundant network system 100 includes a cable assembly 102 used to communicatively couple a compute node 104 with a primary component 106 and a secondary component 108 along redundant signal paths. The cable assembly 102 provides redundant signaling without the use of an electronic switching device. The cable assembly 102 splits the signaling from a single source to a pair of destinations.

In an exemplary embodiment, the compute node 104 is a server. The server may be held in a server rack, such as with other network components. Other types of compute nodes may be used in alternative embodiments, such as a stand-alone computer. In an exemplary embodiment, the primary component 106 is a network switch and the secondary component 108 is a redundant network switch. The primary and secondary components 106, 108 may be other types of network components in alternative embodiments. Optionally, the primary and secondary components 106, 108 may be held in the server rack with the compute node 104. For example, the primary and secondary components 106, 108 may be top-of-rack (ToR) network switches. The cable assembly 102 forms two signal paths between the compute node 104 and the primary and secondary components 106, 108. The cable assembly 102 has a single input in the pair of outputs for connecting the single compute node 104 with the pair of primary and secondary components 106, 108. For example, the cable assembly 102 may be a Y-cable that is split between a single input and a pair of outputs.

In an exemplary embodiment, the compute node 104 includes a node port 110. The node port 110 provides an interface for the cable assembly 102. In an exemplary embodiment, the node port 110 is an electrical connector, such as a receptacle connector 114. In various embodiments, the node port 110 includes a QSFP (quad small form-factor pluggable) type receptacle interface. In an exemplary embodiment, the compute node 104 includes a network interface card 112 having the node port 110. The compute node 104 includes a component 122 transmitting and/or receiving data. In various embodiments, the component 122 includes a circuit board 124 having a microcontroller or processor 126 and a memory 128. The component 122 may include other electronic components in various embodiments. The network interface card 112 is electrically connected to the component 122. The cable assembly 102 is electrically connected to the component 122 through the node port 110 of the network interface card 112.

In an exemplary embodiment, the primary component 106 includes a primary switch 130. The primary switch 130 includes a primary switch component 132 configured to transmit and/or receive data. In various embodiments, the primary switch component 132 includes a circuit board 134 having a microcontroller or processor 136 and a memory 138. The primary switch component 132 may include other electronic components in various embodiments. In an exemplary embodiment, the primary switch 130 includes a primary switch port 140 coupled to the primary switch component 132. The primary switch port 140 defines an interface for the cable assembly 102. The primary switch port 140 includes an electrical connector, such as a receptacle connector 142. In various embodiments, the receptacle connector 142 is a QSFP type receptacle connector. The receptacle connector 142 is electrically coupled to the primary switch component 132. For example, the receptacle connector 142 may be mounted to the circuit board 134.

In an exemplary embodiment, the secondary component 108 includes a secondary switch 150. The secondary switch 150 includes a secondary switch component 152 configured to transmit and/or receive data. In various embodiments, the secondary switch component 152 includes a circuit board 154 having a microcontroller or processor 156 and a memory 158. The secondary switch component 152 may include other electronic components in various embodiments. In an exemplary embodiment, the secondary switch 150 includes a secondary switch port 160 coupled to the secondary switch component 152. The secondary switch port 160 defines an interface for the cable assembly 102. The secondary switch port 160 includes an electrical connector, such as a receptacle connector 162. In various embodiments, the receptacle connector 162 is a QSFP type receptacle connector. The receptacle connector 162 is electrically coupled to the secondary switch component 152. For example, the receptacle connector 162 may be mounted to the circuit board 154.

The cable assembly 102 is used to communicatively coupled the compute node 104 with the primary switch 130 and the secondary switch 150. The cable assembly 102 includes a node connector 200, a primary connector 202, a secondary connector 204, a first cable 206 between the node connector 200 and the primary connector 202 and a second cable 208 between the node connector 200 and the secondary connector 204. The first cable 206 defines a primary communication line and the second cable 208 defines a redundant, secondary communication line. The node connector 200 forms a single connector interface at the front end while the primary and secondary connectors 202, 204 form a pair of connector interfaces at the rear end.

In an exemplary embodiment, the node connector 200 is a plug connector, such as an I/O transceiver module. For example, the node connector 200 may be a QSFP type plug connector. In various embodiments, the node connector 200 has a QSFP 28 form factor or a QSFP 56 form factor. The node connector 200 may be another type of connector, such as a QSFP-DD or OSFP (octal small format pluggable).

In an exemplary embodiment, the secondary connector 204 is a plug connector, such as an I/O transceiver module. For example, the secondary connector 204 may be a QSFP type plug connector. In various embodiments, the secondary connector 204 has a QSFP 28 form factor or a QSFP 56 form factor. The secondary connector 204 may be another type of connector, such as a QSFP-DD or OSFP (octal small format pluggable).

In an exemplary embodiment, the cable assembly 102 includes a signal splitting circuit 210 between the node connector 200 and the primary and secondary connectors 202, 204. The signal splitting circuit 210 is used to split the signal from a single input to a pair of redundant outputs.

Figure 2:
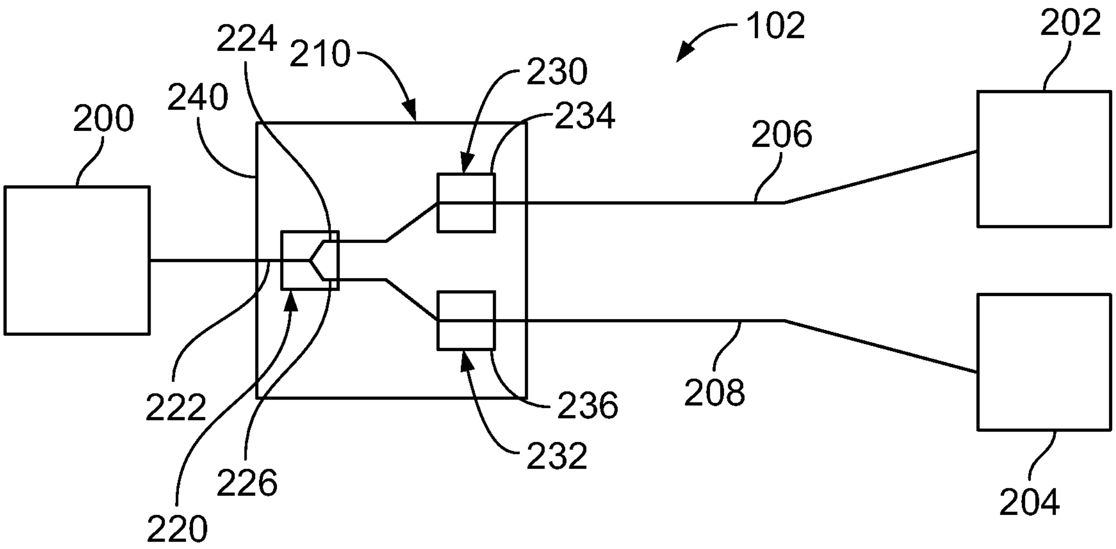
FIG. 2 is a schematic illustration of a cable assembly of the redundant network system in accordance with an exemplary embodiment.

FIG. 2 is a schematic illustration of the cable assembly 102 in accordance with an exemplary embodiment. The cable assembly 102 extends between the node connector 200 and the primary and secondary connectors 202, 204. The cable assembly 102 includes the first cable 206 between the node connector 200 and the primary connector 202. The cable assembly 102 includes the second cable 208 between the node connector 200 and the secondary connector 204. In an exemplary embodiment, the signal splitting circuit 210 is located downstream of the node connector 200 and upstream of the first and second cables 206, 208.

In an exemplary embodiment, the signal splitting circuit 210 includes a splitter 220 having a single input 222, a first output 224, and a second output 226. The input 222 is electrically coupled to the node connector 200. The first output 224 is electrically coupled to the first cable 206. The second output 226 is electrically coupled to the second cable 208. The signal coming into the splitter 220 at the input 222 is split into a first branch going to the first output 224 and the second branch going to the second output 226. As such, the redundant signals are split by the splitter 220 for transmission to the primary and secondary switches 130, 150. In an exemplary embodiment, the cables 206, 208 are high speed cables. For example, the cables 206, 208 may include a plurality of differential pair conductors. In various embodiments, the cables 206, 208 may each include a plurality of twin-axial cablets.

In an exemplary embodiment, the signal splitting circuit 210 includes a first signal conditioner 230 electrically coupled to the first output 224 and a second signal conditioner 232 electrically coupled to the second output 226. The first cable 206 is electrically coupled to the first signal conditioner 230. The second cable 208 is electrically coupled to the second signal conditioner 232. In an exemplary embodiment, the first signal conditioner 230 includes a first retimer 234 and the second signal conditioner 232 includes a second retimer 236. The retimers 234, 236 amplify the signals. The retimers 234, 236 time the signals to a reference clock. The retimers may condition the signals by providing equalization functions, such as to compensate for jitter and in turn transmit a conditioned signal downstream.

In an exemplary embodiment, the signal splitting circuit 210 includes a circuit board 240. The splitter 220 may be formed by one or more electrical components and/or circuits of the circuit board 240. In various embodiments, the splitter 220 may be a separate circuit component mounted to the circuit board 240. For example, the splitter 220 may be a thin-film power splitter. The splitter 220 is a passive component. The splitter 220 splits the signals from the input 222 to the outputs 224, 226 without an electronic switching device or other active component. The retimers 234, 236 may be formed by one or more electrical components and/or circuits of the circuit board 240. In various embodiments, the retimers 234, 236 are chips, such as integrated circuits. The signal splitting circuit 210 may include other electrical components on the circuit board 240, such as for signal conditioning. In an exemplary embodiment, the circuit board 240 may be contained within the node connector 200. For example, the circuit board 240 may be contained within a housing of the node connector 200. In another example, the circuit board 240 may be located exterior to the node connector 200 in a separate housing. The circuit board 240 may include contact pads or other circuit traces for interfacing with the first and second cables 206, 208. For example, conductors of the cables 206, 208 may be soldered to the contact pads.

Figure 3:
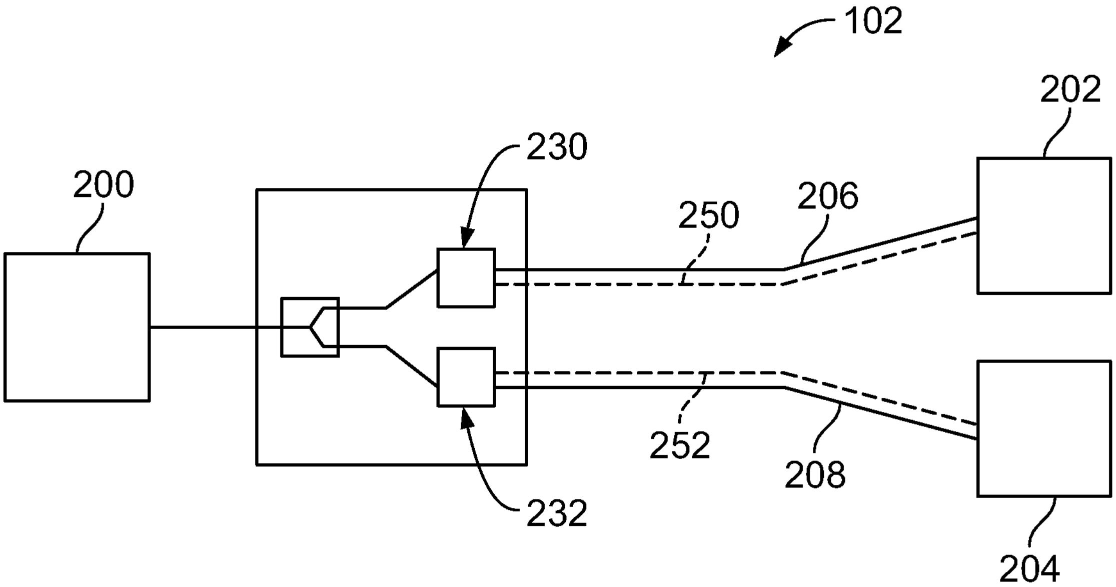
FIG. 3 is a schematic illustration of the cable assembly in accordance with an exemplary embodiment.

FIG. 3 is a schematic illustration of the cable assembly 102 in accordance with an exemplary embodiment. The cable assembly 102 includes the first and second cables 206, 208 extending between the node connector 200 and the primary and secondary connectors 202, 204. The cable assembly 102 includes a first serial communication bus 250 between the node connector 200 and the primary connector 202. The cable assembly 102 includes a second serial communication bus 252 between the node connector 200 and the secondary connector 204. The first and second serial communication buses 250, 252 are associated with the first and second cables 206, 208. In various embodiments, the first and second serial communication buses 250, 252 may be integrated into the first and second cables 206, 208, respectively. For example, the first and second serial communication buses 250, 252 may be defined by wires or conductors of the cables 206, 208. Alternatively, the first and second communication buses 250, 252 may be separate wires or cables extending between the connectors.

The first serial communication bus 250 is configured to be electrically connected with the first signal conditioner 230. The first serial communication bus 250 enables and disables data communication along the first cable 206. For example, during a primary mode of operation, the first serial communication bus 250 enables data communication along the first cable 206. During a secondary mode of operation, the first serial communication bus 250 disables data communication along the first cable 206. In an exemplary embodiment, the first serial communication bus 250 operates on an I2C protocol to control signaling along the first cable 206.

The second serial communication bus 252 is configured to be electrically connected with the second signal conditioner 232. The second serial communication bus 252 enables and disables data communication along the second cable 208. For example, during a primary mode of operation, the second serial communication bus 252 disables data communication along the second cable 208. During the secondary mode of operation, the second serial communication bus 252 enables data communication along the second cable 208. In an exemplary embodiment, the second serial communication bus 252 operates on an I2C protocol to control signaling along the second cable 208.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A cable assembly for a redundant network system having a compute node having a node port, a primary switch having a primary switch port, and a secondary switch having a secondary switch port, the cable assembly comprising:

a node connector configured to be coupled to the node port;

a primary connector configured to be coupled to the primary switch port;

a secondary connector configured to be coupled to the secondary switch port;

a signal splitting circuit between the node connector and the primary and secondary connectors;

a first cable coupled between the signal splitting circuit and the primary connector; and a second cable coupled between the signal splitting circuit and the secondary connector;

wherein the first and second cables form redundant signal paths between the single node port of the compute node and the primary and secondary switch ports of the primary and secondary switches.

2. The redundant network system of claim 1, wherein the cable assembly splits the signals from the compute node to the primary and secondary switches without an electronic switching device.

3. The redundant network system of claim 1, wherein the signal splitting circuit includes a splitter having a single input, a first output, and a second output, the input being electrically coupled to the node connector, the first output being electrically coupled to the first cable, the second output being electrically coupled to the second cable.

4. The redundant network system of claim 1, wherein the signal splitting circuit includes a splitter having a single input, a first output, and a second output, the signal splitting circuit includes a first signal conditioner electrically coupled to the first output and a second signal conditioner electrically coupled to the second output.

5. The redundant network system of claim 4, wherein the input is electrically coupled to the node connector, the first cable being electrically coupled to the first signal conditioner, the second cable being electrically coupled to the second signal conditioner.

6. The redundant network system of claim 4, wherein the first signal conditioner includes a first retimer and the second signal conditioner includes a second retimer.

7. The redundant network system of claim 1, wherein the cable assembly includes a first serial communication bus associated with the first cable extending between the signal splitting circuit and the primary connector, and wherein the cable assembly includes a second serial communication bus associated with the second cable extending between the signal splitting circuit and the secondary connector.

8. The redundant network system of claim 7, wherein the first and second serial communication buses are operated on an I2C protocol to control signaling along the first and second cables.

9. A cable assembly for a redundant network system having a compute node having a node port, a primary switch having a primary switch port, and a secondary switch having a secondary switch port, the cable assembly comprising:

a node connector configured to be coupled to the node port;

a primary connector configured to be coupled to the primary switch port;

a secondary connector configured to be coupled to the secondary switch port;

a signal splitting circuit between the node connector and the primary and secondary connectors, the signal splitting circuit including a splitter having a single input, a first output and a second output, the signal splitting circuit including a first signal conditioner coupled to the first output and a second signal conditioner coupled to the second output;

a first cable coupled between the first signal conditioner of the signal splitting circuit and the primary connector; and a second cable coupled between the second signal conditioner of the signal splitting circuit and the secondary connector;

wherein the first and second cables form redundant signal paths between the single node port of the compute node and the primary and secondary switch ports of the primary and secondary switches.

10. The redundant network system of claim 9, wherein the first signal conditioner includes a first retimer and the second signal conditioner includes a second retimer.

11. The redundant network system of claim 9, wherein the cable assembly includes a first serial communication bus associated with the first cable extending between the signal splitting circuit and the primary connector, and wherein the cable assembly includes a second serial communication bus associated with the second cable extending between the signal splitting circuit and the secondary connector.

12. The redundant network system of claim 9, wherein the cable assembly splits the signals from the compute node to the primary and secondary switches without an electronic switching device.

13. A redundant network system comprising:

a compute node having a network interface card including a node port;

a primary switch having a primary switch component and a primary switch port coupled to the primary switch component;

a secondary switch having a secondary switch component and a secondary switch port coupled to the secondary switch component; and a cable assembly having a node connector coupled to the node port, a primary connector coupled to the primary switch port, and a secondary connector coupled to the secondary switch port, the cable assembly including a signal splitting circuit between the node connector and the primary and secondary connectors, the cable assembly including a first cable between the signal splitting circuit and the primary connector and a second cable between the signal splitting circuit and the secondary connector.

14. The redundant network system of claim 13, wherein the first cable and the second cable form redundant signal paths between the single node port of the compute node and the pair of primary and secondary switch ports of the primary and secondary switches.

15. The redundant network system of claim 13, wherein the signal splitting circuit includes a splitter having a single input, a first output, and a second output, the input being electrically coupled to the node connector, the first output being electrically coupled to the first cable, the second output being electrically coupled to the second cable.

16. The redundant network system of claim 13, wherein the signal splitting circuit includes a splitter having a single input, a first output, and a second output, the signal splitting circuit includes a first signal conditioner electrically coupled to the first output and a second signal conditioner electrically coupled to the second output.

17. The redundant network system of claim 16, wherein the input is electrically coupled to the node connector, the first cable being electrically coupled to the first signal conditioner, the second cable being electrically coupled to the second signal conditioner.

18. The redundant network system of claim 16, wherein the first signal conditioner includes a first retimer and the second signal conditioner includes a second retimer.

19. The redundant network system of claim 13, wherein the cable assembly includes a first serial communication bus associated with the first cable extending between the signal splitting circuit and the primary connector, and wherein the cable assembly includes a second serial communication bus associated with the second cable extending between the signal splitting circuit and the secondary connector.

20. The redundant network system of claim 13, wherein the compute node is a server.

* * * * *